Aug. 17, 1965  F. M. DOBBERTIEN  3,200,898
LOAD SUPPORTING DEVICE
Filed July 29, 1963
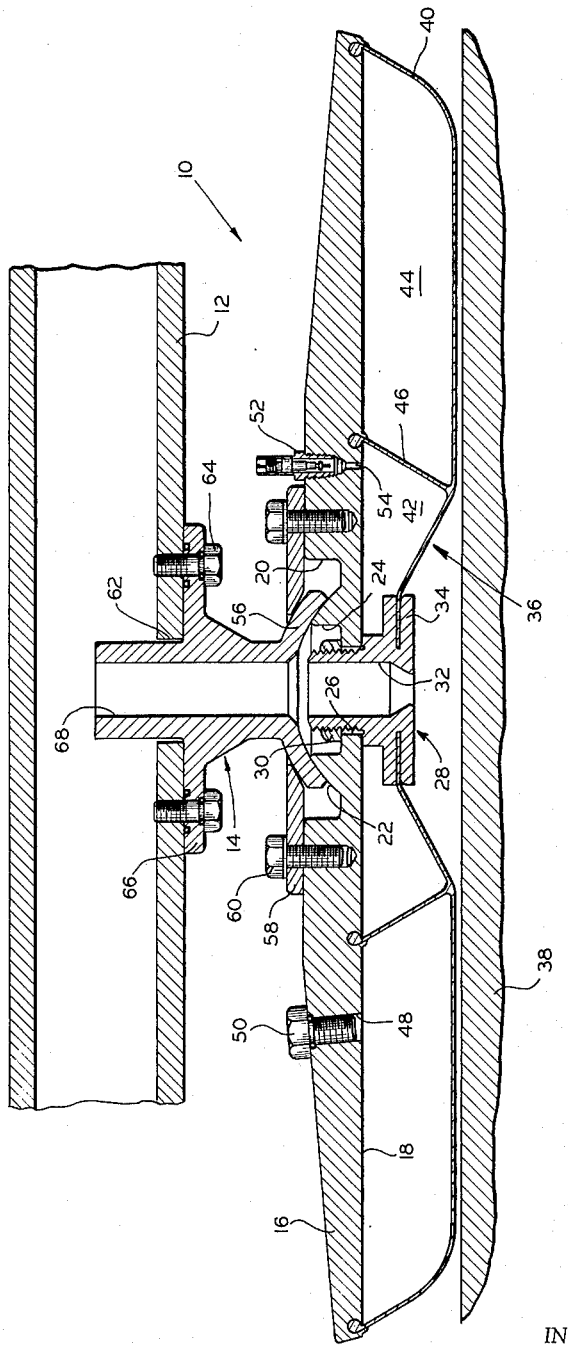
INVENTOR
FRANCIS M. DOBBERTIEN
BY
*Kenneth C. Witt*
ATTORNEY

United States Patent Office 3,200,898
Patented Aug. 17, 1965

3,200,898
LOAD SUPPORTING DEVICE
Francis M. Dobbertien, Battle Creek, Mich., assignor to Clark Equipment Company, a corporation of Michigan
Filed July 29, 1963, Ser. No. 298,140
3 Claims. (Cl. 180—7)

This invention relates to load supporting devices or so-called air casters which serve to support a load and also to provide a film of air between a floor or similar supporting surface and the air caster in order to reduce the co-efficient of friction between the air caster and the supporting floor. More specifically, this invention relates to an improvement in such load supporting devices or air casters.

Load supporting devices of this general type have been described and illustrated previously in U.S. Patents Nos. Re. 25,045 and 3,052,483. As pointed out in these patents, it is necessary for the so-called air caster to conform closely to the contour of the supporting floor over which it operates. Otherwise, the pressurized air being supplied to the air caster will escape rapidly from one point on the air caster with the result that an air film between the air caster and the supporting floor will not be maintained, thus causing the air caster to bind or stick on the floor. In order to overcome this problem it is known to provide the air caster with a flexible smooth undersurface backed up by a resilient layer of foam plastic, such as foam rubber, polyurethane or the like. In such air casters utilizing an intermediate layer of foam material, the maximum load per square foot which the air caster can support is restricted to that which will not exceed the limit of compressibility of the foam material in order to maintain sufficient resiliency in the air caster to enable it to conform to the variations in configuration of the floor. Such air casters are used in conjunction with platform or pallet, the entire unit serving as a material handling device. Obviously, the material handling unit may be designed for a maximum load weight, but on different occasions would be used for loads that would be substantially less than the maximum load capacity for which it is designed. While the material handling unit will function satisfactorily at or near its designed load capacity, if it is used for a substantial underload, then the intermediate layer of foam material tends to be too stiff, and so the air caster does not conform well to the variations in floor configuration with the result that it may bind or otherwise tend to lose the air film between the air caster and the supporting floor. Consequently, it is a principal object of the present invention to provide a load supporting device or air caster which conforms readily to variations in floor contour over a wide loading range.

A further object of my invention is to provide an air caster which has a variable ability for conforming to floor contour under load.

A still further object of my invention is to provide an improved air caster.

In carrying out my invention in a preferred embodiment thereof I provide a plate member having an air nozzle located centrally thereof. A smooth membrane is affixed to the plate member adjacent the outer edge thereof and is also affixed to the nozzle to define therewith a closed chamber. The chamber is divided into two annular compartments by means of a resilient membrane portion which is affixed to the plate member intermediate the outer edge and the nozzle. The compartment adjacent the nozzle is filled with air under pressure and the other compartment is filled with a liquid, such as water or oil.

The above and other objects, features and advantages of my invention will be readily apparent to persons skilled in the art from the following description when taken in conjunction with the accompanying drawing the single figure of which is a cross-sectional view of a preferred embodiment of my invention used in conjunction with a load carrying platform or pallet.

Referring now to the drawing, the numeral 10 denotes a load supporting device or air caster which is connected to the underside of a hollow platform or pallet (only a portion of which is shown) which may be any desired shape, although a triangular or rectangular shape is generally found to be preferable. The air caster 10 is connected to pallet 12 by means of a combined air conduit and support member 14.

The air caster 10 includes a generally annular plate member 16 which has a substantially planar undersurface 18 and a centrally located cylindrical recess 20 in the top surface.

The bottom of recess 20 has an upwardly protruding hemishperical bearing surface 22 which cooperates with support member 14 to form a swivel connection as will be explained more fully hereinafter. There is a centrally located cylindrical recess 24 in bearing surface 22. An annular opening 26 located centrally of recess 24 extends through plate member 16 to undersurface 18.

An air nozzle 28 is disposed in opening 26 and held in place by means of a nut 30 which threadably engages a threaded portion of air nozzle 28 and seats against the bottom of recess 24. Air nozzle 28 includes an air passage 32 and a radially extending bifurcated flange portion 34 to which a membrane is affixed as will be explained shortly.

Attached to undersurface 18 of plate member 16 is a relatively thin, smooth, abrasion-resistant membrane or skin 36 of rubber, plastic, nylon textile fabric, or the like which rides over a supporting floor or ground surface 38. Membrane 36 has a first portion 40 which is generally ring-like in shape and which is affixed at the outer periphery thereof to plate member 16 at the outer edge thereof and affixed at the inner periphery thereof to air nozzle 28. The connection of portion 40 of membrane 36 to air nozzle 28 preferably is made by inserting portion 40 into the slot defined by the bifurcated flange 34, the bifurcated portions of flange 34 then being squeezed together to retain membrane portion 40 therein. At this point it will be seen that membrane portion 40 defines together with air nozzle 28 and plate member 16 a closed chamber which is divided into a first chamber or compartment 42 and a second chamber or compartment 44 by means of a second portion of membrane 36 which is ring-like in shape and has the inner periphery thereof affixed to the first portion 40 and has the outer periphery thereof affixed to plate member 16 intermediate the outer edge thereof and air nozzle 28. It will be noted that chambers 42 and 44 are divided from each other only by membrane portion 46 which preferably has a certain degree of resiliency and/or flexibility.

Chamber 44 is adapted to be filled with a fluid through an opening 48 in plate member 16 which is sealed by means of a cap screw 50. I prefer to fill chamber 44 with oil or water, although pressurized air, for example, could be used as well. Chamber 42 is adapted to be filled with a gas, such as air, under pressure by means of valve 52 which is inserted in a passage 54 that extends through plate member 16 and communicates with chamber 42. The valve 52 is a conventional type, such as is used with automobile tires, for example.

As pointed out hereinabove air caster 10 is attached to pallet 12 by means of combined air conduit and support member 14 which includes a hemispherical flange 56, the underside of which cooperates with bearing surface 22 to provide a swivel joint that permits air caster 10 to pivot through a full 360° about a vertical axis and pivot to a limited extent from the horizontal. Air caster 10 is retained on combined air conduit and support member 14 by means of a retainer ring 58 which is connected to plate member 16 by means of a plurality of machine screws 60 which pass through retainer ring 58 and threadably engage plate member 16. The inner peripheral edge of retainer ring 58 is beveled and abuts the upper side of flange 56, whereby air caster 10 is prevented from separating from support member 14. The end of combined air conduit and support member 14 opposite flange 56 extends through an opening 62 in pallet 12 and is connected to pallet 12 by means of a plurality of machine screws 64 which threadably engage the underside of pallet 12 and pass through a connecting flange 66 that is integral with combined air conduit and support member 14. Combined air conduit and support member 14 also includes a passage 68 which communicates at one end thereof with the interior of pallet 12 and at the other end thereof with nozzle 28. Thus, it will be seen that the underside of air caster 10 is in communication through nozzle 28 and passage 68 with the interior of pallet 12 which in operation serves as a duct for pressurized air.

Turning now to the operation of my invention, it will be assumed that pallet 12 is generally rectangular in shape and that air casters 10 are connected thereto adjacent each corner of pallet 12 to support pallet 12 on supporting floor 38 at four points. It will be understood, however, that a greater or lesser number of air casters may be utilized if desired, as well as other pallet shapes. Further, it will be assumed that the interior of pallet 12 is connected to a source of pressurized air through a suitable connection, not shown, so that air is constantly flowing from the interior of pallet 12 through passages 68 and 32 and out of nozzle 28 thereby providing a film of air between membrane portion 40 and supporting floor 38. The thickness of the air film between membrane portion 40 and the supporting floor 38 has been somewhat exaggerated in the drawing. Actually, the thickness of such an air film is on the order of .0015 to .0030 of an inch.

With pressurized air being supplied to the interior of pallet 12 so that a continuous flow of air is exhausting from nozzle 28 to provide a film of air between the air casters 10 and supporting floor 38, the pallet 12 may be moved easily across supporting floor 38 with a minimum of friction between membrane portion 40 and supporting floor 38.

Now, if an obstruction on the floor such as a protruding nail head is encountered by one of the air casters, the membrane portion 40 conforms locally to the obstruction so that the air does not escape from underneath the air caster all at one point thereby destroying the air film. By conforming to the obstruction, the membrane portion 40 necessarily displaces a portion of the fluid contained in chamber 44. This displacement of fluid 44 is accomplished by a radially inward bulging of membrane 46 against the force of the pressurized air contained in chamber 42. By increasing the pressure of air within chamber 42, the resistance of membrane portion 40 to being deformed by an obstruction is increased and the load supporting capacity of air caster 10 is increased. Conversely, decreasing the pressure of the air in chamber 42 results in membrane portion 40 more readily conforming to obstructions and the load supporting capacity of air caster 10 decreasing.

While I have described a preferred embodiment of my invention, it will be understood that such description is illustrative only, and that my invention is capable of being embodied in other forms without departing from the scope or spirit of my invention. Therefore, the limits of my invention should be determined from the following appended claims taken in conjunction with the prior art.

I claim:

1. An air caster comprising an upper plate member, an air nozzle connected to said plate member, and a membrane having first and second connected portions, said second portion being connected to said first portion intermediate the ends of said first portion, said first portion being affixed to said plate member and said nozzle and said second portion being affixed to said plate member so that first and second closed compartments adjacent to each other are defined by said membrane portions, said plate member and said nozzle, said compartments being substantially filled with fluids of different densities.

2. An air caster comprising an annular plate member, an air nozzle connected to said plate member centrally thereof, a smooth membrane having a first ring-like portion with inner and outer peripheries and a second ring-like flexible portion with an outer periphery, the outer periphery of said first portion being affixed to said plate member adjacent the outer edge thereof and the inner periphery of said first portion being affixed to said nozzle, the outer periphery of said second portion being affixed to said plate member intermediate the outer edge thereof and said nozzle so that a first closed chamber is defined by said nozzle, plate member and first portion and a second closed chamber adjacent to and separate from said first chamber is defined by said first and second portions and said plate member, valve means for supplying said first chamber with pressurized air and means for substantially filling said second chamber with a liquid.

3. An air caster comprising an annular plate, an air discharge nozzle fixed to said plate centrally thereof, and membrane means attached to said plate and defining therewith a closed inner annular chamber around said nozzle and a closed outer annular chamber, said chambers being separated by a portion of said membrane means and substantially filled with fluids of different densities.

References Cited by the Examiner

UNITED STATES PATENTS

| | | | |
|---|---|---|---|
| 497,965 | 5/93 | Owen | 152—330 |
| 1,049,677 | 1/13 | Craig | 152—330 |
| 1,955,711 | 4/34 | Mills | 152—340 |
| 3,052,483 | 9/62 | Petersen | 180—7 |
| 3,119,598 | 1/64 | Petersen | 180—7 |

OTHER REFERENCES

"Design News," May 23, 1960; pages 6 and 7, "Ground Cushion Vehicle Balances With Single Engine."

A. HARRY LEVY, *Primary Examiner.*

PHILIP ARNOLD, *Examiner.*